US006423287B1

(12) United States Patent
Chung et al.

(10) Patent No.: US 6,423,287 B1
(45) Date of Patent: Jul. 23, 2002

(54) METHOD FOR PRODUCTION OF ALUMINUM NITRIDE POWER

(75) Inventors: Shyan-Lung Chung; Wen-Liang Yu, both of Yungkang (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/199,982

(22) Filed: Nov. 23, 1998

(30) Foreign Application Priority Data

Nov. 24, 1997 (TW) .......................................... 86117545

(51) Int. Cl.$^7$ ........................................... C01B 21/072
(52) U.S. Cl. ...................................................... 423/412
(58) Field of Search ......................................... 423/412

(56) References Cited

U.S. PATENT DOCUMENTS

| | | | |
|---|---|---|---|
| 5,453,407 A | * 9/1995 | Chung et al. ............... | 423/412 |
| 5,693,305 A | * 12/1997 | Revankar et al. ........... | 423/412 |
| 5,846,508 A | * 12/1998 | Chung et al. ............... | 423/412 |

\* cited by examiner

Primary Examiner—Wayne Langel

(74) Attorney, Agent, or Firm—Chi Ping Chang; Pacific Law Group LLP

(57) ABSTRACT

This invention concerns a method for production of AlN powder. The reactants discovered in the invention are aluminum powder and a compound which contains $NH_x$ (e.g. $NH_2$, $NH_3$, $NH_4$, $N_2H_4$, and $N_2H_6$ etc.) or halogens and which can be thermally decomposed or vaporized below the melting point of Al (660° C.). These two reactants are mixed at an appropriate ratio and then pressed into a compact with an appropriate shape. These two reactants, after being mixed at an appropriate ratio, may also be placed in a refractory container which has an opening at one end or has porous walls. In preparing the reactant compact or the reactant mixture, a dilutant such as AlN powder may also be added and mixed with the two reactants. This reactant compact or reactant mixture is then placed in a reaction chamber which is filled with nitrogen. By heating the reactant compact or the reactant mixture, the combustion synthesis reaction is ignited and AlN powder is produced. The compound decompress or vaporizes during being heated, thus creating numerous pores in the reactant compact or the reactant mixture. The nitrogen thus flows easily into the reactant compact(or the mixture) to react with Al. Besides, the halogen can catalyze the nitridation of Al and the $NH_x$ may attack easily the Al, thus promoting the reaction. AlN powder with high purity can therefore be produced under low nitrogen pressures (0.9–10 atm).

21 Claims, 2 Drawing Sheets

METHOD FOR PRODUCTION OF ALUMINUM NITRIDE POWER

Figure 1:
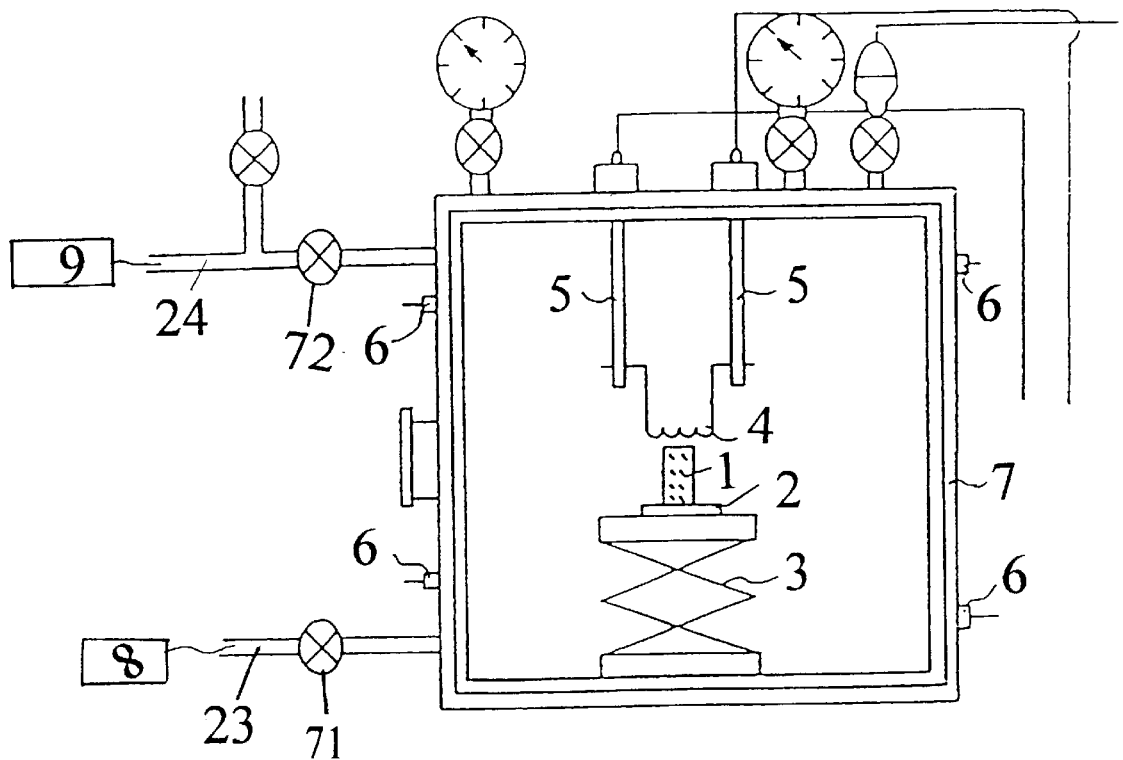

Comparing to other methods, combustion synthesis method is new for the production of ceramic materials. It utilizes self-propagating combustion reaction between the reactants to produce ceramic products. It has the advantages of high production rate, energy efficiency, simple process, and ease for mass production. However, in view of commercial production, combustion synthesis method still needs some improvements.

The followings are the prior arts utilizing combustion synthesis method for the production of aluminum nitride.

(1) Japanese patent No.63-274,605

With appropriate ratio, prepare powder mixture of aluminum, aluminum nitride, and one of the followings: calcium carbonate ($CaCO_3$), calcium nitrate ($Ca(NO_3)_2$), yttrium oxide ($Y_2O_3$), barium carbonate ($BaCO_3$), barium nitrate ($Ba(NO_3)_2$), yttrium nitrate ($Y(NO_3)_3$), cerium oxide ($CeO_2$), and yttrium oxalate ($Y_2(C_2O_4)_2 \cdot 8H_2O$). Press the mixture into appropriate shape and place it in the environment filled with $N_2$ gas up to 50 atm. aluminum nitrate (AlN) powder forms after the combustion reaction is ignited by electrical heating plates.

(2) Japanese patent No.64-76,906

With appropriate ratio, prepare powder mixture of aluminum and aluminum nitride in a refractory container having porous walls and place the container in liquid nitrogen. Ignite the combustion reaction with electrical heating wires. aluminum nitride powder is therefore formed.

(3) Japanese patent No.64-76,905

With appropriate ratio, prepare mixture of aluminum and sodium azide or other solid-state nitrogen containing compounds such as potassium azide ($KN_3$) and barium azide ($Ba_3N_2$) powders in a refractory container. With ignition agent above the powder, the container is placed in a reactor with electrical heater and filled with nitrogen less than 10 $Kg/cm^2$. The process starts with heating the reactants with the electrical heater and igniting the ignition agent with electrical heating wire. The combustion reaction is then taken place to form aluminum nitride powder.

(4) ROC patent No.71,873 and U.S. Pat. No. 5,460,794

Prepare mixture of aluminum powder and solid-state nitrogen containing compounds. Press the mixture into shape, cover the mixture with ignition agent, and place it in a chamber filled with nitrogen. The process starts by igniting the ignition agent. The reaction is then taken place to form aluminum nitride powder.

(5) ROC patent No.67,194 and U.S. Pat. No. 5,453,407

Prepare mixture of aluminum powder and solid-state nitrogen containing compounds. Ammonium halide is added into the mixture. Press the mixture into shape, cover the mixture with ignition agent, and place it in a chamber filled with nitrogen. The process starts with ignition of the ignition agent. The reaction is then taken place to form aluminum nitride powder.

(6) U.S. patent application Ser. No. 08/853,576 (filed on May 9, 1997), now U.S. Pat. No. 5,846,508

Prepare mixture of aluminum powder and ammonium halide as reactants. Press the mixture into a compact or place it in a refractory container having an opening end or having porous walls, and place the compact or the container in a chamber filled with nitrogen. The reaction is ignited by heating the reactant mixture to form aluminum nitride powder.

There are two key problems concerning the above mentioned combustion synthesis method for the production of aluminum nitride powder:

(1) How to supply sufficient nitrogen needed;
(2) How to make the reaction complete.

According to 1991.M. Costantino and C. Firpo in J. Mater. Res volumn 6 page 2397, if nitrogen gas is used as nitrogen source, the pressure must reach at least 1,000 atm to start the reaction. According to the application of Japanese patent No.63-274,605, the pressure being used, which is 50atm, is also comparably high. High pressure condition will increase the cost on equipment and operation. Operational complexity and danger are both enhanced.

If liquid nitrogen is used as nitrogen source, as in Japanese patent No.64-76906, high pressure is not necessary. But the low temperature which is required by liquid nitrogen again will increase the cost on equipment and operation. Operational complexity and danger are both enhanced.

If solid-state nitrogen containing compounds are used as nitrogen source, as in Japanese patent No.64-76,905, ROC patent No.71,873 and No.67,194, high pressure is not necessary. But the solid-state nitrogen source needs to thermally decompose easily in order to make the combustion reaction self-propagated. Meanwhile, the reaction needs appropriate arrangement to thermally decompose the solid-state nitrogen source and to make the nitrogen released thereafter react with aluminum powder quickly. Otherwise, problems like pressure accumulation or nitrogen leakage will block the reaction.

The present invention and the filed application of U.S. Ser. No. 08/853,576 have some technical difference. In the application of U.S. Ser. No. 08/853,576, aluminum powder and ammonium halide are used as reactants. In the present invention, aluminum powder and compounds containing $NH_x$ or halogens which can be decomposed or vaporized below the melting point of aluminum are used. Therefore, there is a significant difference in the reactants.

SUMMARY OF THE INVENTION

In accordance with the present invention, method for production of aluminum nitride powder can be explained by two parts:

(1) Reactant mixture is prepared from aluminum powder and a compound, containing $NH_x$ (such as amino group (NH2), ammonia ($NH_3$), ammonium ion ($NH_4$), $N_2H_4$, $N_2H_6$ ect.) or halogens, which can be thermally decomposed or vaporized.

Reactants discovered in the present invention are aluminum powder and a compound which contains $NH_x$ or halogens (such as urea ($CO(NH_2)_2$), $NH_2CO_2NH_4$, ammonium carbonate (($NH_4)_2CO_3$), $NH_4HCO_3$, $HCOONH_4$, $N_2H_4HCl$, $N_2H_4HBr$, $N_2H_4 \cdot 2HCl$, aluminum chloride ($AlCl_3$), aluminum bromide ($AlBr_3$), etc.) and can be thermally decomposed or vaporized below the melting point of aluminum. These two reactants are mixed at an appropriate ratio and then pressed into a compact with an appropriate shape (such as cylinder). These two reactants, after being mixed at an appropriate ratio, may also be placed in a refractory container which has an opening at one end or has porous walls (referred to as reactant compact herein after). In making reactant compacts, certain amount of dilutant (such as aluminum nitride powder) can be added.

(2) Ignition of reactant compact takes place by heating at low nitrogen pressure The above mentioned reactant compact is then placed in a reaction chamber filled with nitrogen. By appropriately heating the reactant compact at one end(such as by tungsten wire, graphite plates, or laser etc., any kind of heating method which can heat one end of the reactant compact up to 1000° C.–1600° C. can be adopted), the combustion synthesis reaction is ignited and aluminum nitride powder with high quality is produced. The nitrogen pressure required in the reaction is about 0.9–6 atm. (The reaction can also be conducted at higher pressures, but that won't be necessary.)

The main difference between the present invention and traditional combustion synthesis method for production of aluminum nitride lies in (1) Reactant compact is prepared from aluminum powder and a compound which contains $NH_x$ or halogens and can be thermally decomposed or vaporized below the melting point of aluminum. (2) Ignition of reactant compact takes place by heating at low nitrogen pressure.

In accordance with one Example of the present invention, compounds which are introduced in the present invention contain $NH_x$ or halogens and can be thermally decomposed or vaporized below the melting point of aluminum. Common examples are urea ($CO(NH_2)_2$), $NH_2CO_2NH_4$, ammonium carbonate (($NH_4)_2CO_3$), $NH_4HCO_3$, $HCOONH_4$, $N_2H_4HCl$, $N_2H_4HBr$, $N_2H_4.2HCl$, aluminum chloride ($AlCl_3$), aluminum bromide ($AlBr_3$), etc. The above examples are only some of the appropriate compounds. Urea ($CO(NH_2)_2$) is the most suitable compound. The weight ratio between urea and aluminum powder can be 0.02–1.5:1 while 0.2:1 is the best ratio.

In accordance with the other Examples of the present invention, among the above mentioned compounds which can be thermally decomposed or vaporized below the melting point of aluminum, urea is the most suitable. The amount of urea can be 0.02–1.5 times the weight of aluminum powder, i.e. the weight ratio between urea and aluminum powder can be 0.02–1.5:1. But 0.2:1 is the best ratio. When pressed into a reactant compact, pressures applied can be 8–50 Kg/cm$^2$ while 10–15 Kg/cm$^2$ is preferred. Appropriate containers are refractory containers having an opening at one end or having porous walls. Refractory containers having an opening at one end can be made from graphite, aluminum nitride, Boron nitride, aluminum oxide, zirconium, or other ceramic materials. Refractory containers having porous walls can be made from graphite, aluminum nitride, Boron nitride, aluminum oxide, zirconium, or other ceramic materials. Heating in nitrogen environment can proceed by applying current to tungsten wire, graphite plates, tungsten plates, graphite resistor which is close to reactant compact. Heating can also proceed by laser irradiation.

BRIEF DESCRIPTION OF THE DRAWINGS AND TABLES

For more complete understanding of the present invention, and for further features and advantages, reference is now made to the following description taken in conjunction with the accompanying drawings and tables, in which:

Table 1: Reaction conditions and results

Table 2: Reaction conditions

Table 3: Reaction conditions

Table 4: Reaction conditions and results

FIG. 1: Schematics of equipment for combustion synthesis reaction in the present invention.

Figure 2:
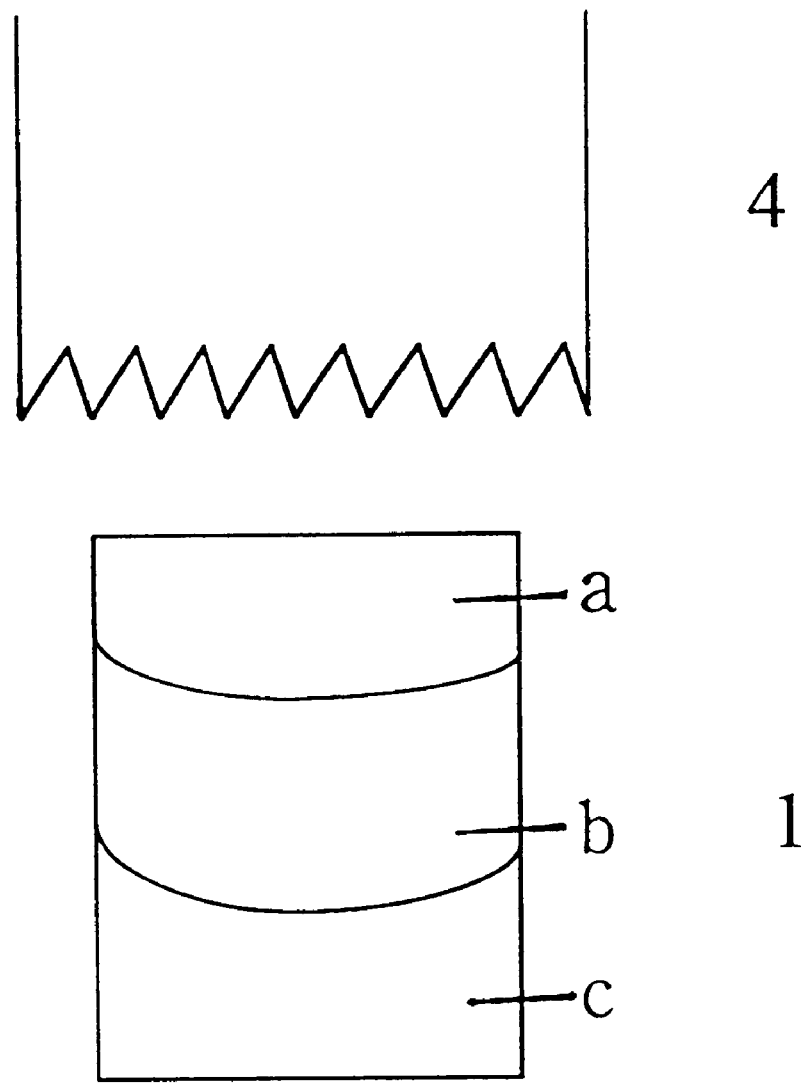

FIG. 2: Schematics of propagation of combustion synthesis reaction in the present invention.

1 . . . reactant compact
2 . . . refractory plate
23 . . . gas output
24 . . . gas inlet
3 . . . adjustable platform
4 . . . heating tungsten wire
5 . . . heating electrodes
6 . . . thermalcouple connector
7 . . . chamber wall
71, 72 . . . valves
8 . . . pumping system
9 . . . gas supply system
a . . . products after combustion
c . . . preheated layer at the combustion wavefront
b . . . layer undergoing combustion reaction

DETAILED DESCRIPTION OF THE INVENTION

The present invention concerns a method for production of aluminum nitride:

(a) prepare reactant mixture from aluminum powder and a compound which can be thermally decomposed or vaporized below the melting point of aluminum(660° C.);

(b) press the reactant mixture into appropriate shape or place the mixture in an appropriate container (these two forms of reactants are referred to as reactant compact in the following paragraphs); and (c) heat the reactant compact or mixture in nitrogen environment to produce aluminum nitride by combustion reaction.

The present invention concerns a method for production of aluminum nitride, aluminum powder and a compound which can be thermally decomposed or vaporized below the melting point of aluminum (660° C.) are mixed in appropriate ratio. The mixture is pressed into appropriate shape or placed in an appropriate container(referred to as reactant compact). Reactant compacts are ignited by heating to form aluminum nitride. Because the compounds which can be thermally decomposed or vaporized below the melting point of aluminum (660 ° C.) are compounds containing $NH_x$ or halogens, those $NH_x$ or halogens containing compounds are thermally decomposed or vaporized to form releasing gas and hence creating numerous pores in the reactant compact. Nitrogen thus flows easily into the reactant compact to react with Al. Besides, halogens can catalyze the nitridation of Al while $NH_x$ may promote the nitridation reaction. AlN powder with high purity can therefore be produced under low nitrogen pressures (0.9–6 atm).

More specifically, compounds which contains $NH_x$ or halogens including urea ($CO(NH_2)2$), $NH_2CO_2NH_4$, ammonium carbonate (($NH_4)_2CO_3$), $NH_4HCO_3$, $HCOONH_4$, $N_2H_4HCl$, $N_2H_4HBr$, $N_2H_2.2HCl$, aluminum chloride ($AlCl_3$), aluminum bromide ($AlBr_3$), etc. The weight ratio between aluminum powder and the above mentioned compounds is 1:0.02–1.5 while the best weight ratio is 1:0.1–0.3.

Among compounds which contains $NH_x$ or halogens and can be thermally decomposed or vaporized below the melting point of aluminum, urea is the most suitable compound. The amount of urea is 0.02–1.5 times of the weight of aluminum powder, i.e. the weight ratio of urea and aluminum powder is 0.02–1.5:1 (w/w) while 0.2:1 is the best ratio. When pressed into a reactant compact, pressures applied can be 8–50 Kg/cm$^2$ while 10–15 Kg/cm2 is preferred. Appropriate containers are refractory containers having an opening at one end or having porous walls. Refractory containers having an opening at one end can be made from graphite, aluminum nitride, Boron nitride, aluminum oxide, zirconium oxide, or other ceramic materials. Refractory containers having porous walls can be made from graphite, aluminum nitride, Boron nitride, aluminum oxide, zirconium oxide, or other ceramic materials. Heating in nitrogen environment can proceed by applying current to tungsten wire, graphite plates, tungsten plates, graphite resistor which is close to reactant compact. Heating can also proceed by laser irradiation. When the reactant compact is large in size, heating can be applied to two or more sides of the compact. The compact can also be preheated before ignition.

After aluminum powder and a compound which can be thermally decomposed or vaporized below the melting point of aluminum (660° C.) are mixed in appropriate ratio, the mixture is made to reactant (referred to as reactant compact) by pressing into appropriate shape or placing in a refractory container having an opening end or having porous walls. In making reactant compact, appropriate amount of dilutant can be added. The appropriate shape mentioned above refers usually cynlinder or other appropriate shape. Dilutant can be aluminum nitride powder.

Ignition of Reactant Compact Takes Place by Heating at Low Nitrogen Pressure

The above mentioned reactant compact is then placed in a reaction chamber filled with nitrogen. By appropriately heating the reactant compact at one end, the combustion synthesis reaction is ignited and aluminum nitride powder with high quality is produced. The nitrogen pressure required in the reaction is about 0.9–6atm. The reaction can also be conducted at higher pressures, but that won't be necessary. Appropriate heating method can be applying current in tungsten wire, graphite plates, tungsten plates or graphite resistor, or laser irradiation etc. which is capable of heating one end of the reactant compact up to 1000° C.–1600° C.

The present invention has great difference from traditional combustion synthesis method for production of aluminum nitride: (1) Reactant compact is prepared from aluminum powder and a compound which can be thermally decomposed or vaporized below the melting point of aluminum. (2) Ignition of reactant compact takes place by heating at low nitrogen pressure. In the present invention, a method for production of aluminum nitride powder, compounds like urea ($CO(NH_2)_2$), $NH_2CO_2NH_4$, ammonium carbonate (($NH_4)_2CO_3$), $NH_4HCO_3$, $HCOONH_4$, $N_2H_4HCl$, $N_2H_4HBr$, $N_2H_4.2HCl$, (called $NH_x$ compounds) and halogen containing compounds like aluminum chloride ($AlCl_3$), aluminum bromide ($AlBr_3$) are introduced. In short, they are $NH_x$ compounds or halogen containing compounds which can be thermally decomposed or vaporized below the melting point of aluminum (660° C.).

The Roles of $NH_x$ Compounds and Halogen Containing Compounds:

(1) Below the melting point of aluminum, $NH_x$ compounds or some halogen containing compounds can decompose or vaporize to create pores in the reactant compact. Nitrogen in the environment can thus reach aluminum more efficiently. (2) When $NH_x$ compounds decompose or vaporize, some $NH_x$ left in reactant compact reacts easily with aluminum to form aluminum nitride. The process promotes the nitridation reaction. (3) According to I. A. Khan and T. R. Bhat in J. Less-Common Metals 1965, volume 9, page 388, halogens in halogen containing compounds can catalyze nitridation reaction.

In making reactant compact, appropriate amount of dilutant can absorb heat and thus slows down the melting of aluminum to keep reactant compact porous. Moreover, dilutant can help to control or reduce the combustion temperature, thus altering the product morphology. Care should be taken when choosing dilutant. The reaction should not be affected and there should not be any pollution product due to the presence of dilutant. Aluminum nitride is usually the suitable.

Prepare appropriate amount of aluminum powder and urea powder with weight ratio 1:0.02–1.5. Completely mix the powder reactant by an appropriate method. Press the mixture into a reactant compact in an appropriate shape. Place the reactant compact (1) on a refractory plate (2) sitting on adjustable platform (3) in a high pressure vacuum chamber as shown in FIG. 1. Adjust the height of adjustable platform (3) to ensure 5–6 mm between the tip of the reactant compact and heating tungsten wire (4). Seal the high pressure vacuum chamber. Heating electrodes (5) and thermocouples (6) used to measure temperature are inserted in a leaktight configuration through wall (7) of the high pressure vacuum chamber, so necessary operation can be controlled externally.

Evacuate the high pressure vacuum chamber by pumping system (8) from gas output (23) to obtain vacuum condition of $10^{-1}$ torr. Fill high purity nitrogen by nitrogen supply system (9) from gas inlet (24) to obtain nitrogen pressure of 5 atm. Repeat the pumping/filling cycle several times to purge the high pressure vacuum chamber and to dehyrate/degas the reactant powder, i.e. remove the attached air and moisture on the reactant powder surface. Then fill the high pressure vacuum chamber with high purity nitrogen to obtain reaction pressure. Finally, apply several to tens amperes to heating wire (4) via electrodes to start reaction.

As shown in FIG. 2, when reactant compact (1) is heated by heating tungsten wire (4), the heat conveys downward from a, b to c. In the heat transfer process, gas from urea decomposition and thermal expansion releases and forms numerous pores which results in that the reactant compact is filled up with decomposed nitrogen containing compound and nitrogen gas. As heating goes on, the whole reactant compact is turned into aluminum nitride powder. When the reaction comes to complete stop, wait for the product to cool down. Then open valve (71) to restore 1 atm in the high pressure vacuum chamber. Finally, open the chamber and remove the product.

According to the present invention: a method for production of aluminum nitride powder, the product conversion is extremely high under normal reaction conditions. Under certain reaction conditions, small amounts of residual aluminum are found. The aluminum left can be removed by dipping in acid solution. The production yield in the present invention is normally 95% or higher, i.e., 1 g aluminum can turn into at least 1.4 g of aluminum nitride powder. The oxygen content in the product is less than 1%. Types and amount of impurities in the product varies with the purity of source aluminum powder and urea. Because high temperature combustion can remove volatile impurities, product contains less impurity than the reactants. The form of aluminum nitride powder is mostly granular, and secondly tissue like. Most of the aluminum nitride powder can be made as small as 1–10 $\mu$m by hand grinding.

If compounds containing $CO_3$ and $NH_x$ such as ammonium carbonate (($NH_4)_2)CO_3$) are used as reactants to react with aluminum powder, the product will contain $Al_{10}N_8O_3$ ($8AlN.Al_2O_3$). The Oxygen in the product is about 5%.

EXAMPLES 1–4

Different Nitrogen Pressure

After mixing aluminum powder and urea ($CO(NH_2)_2$) powder with weight ratio $Al:CO(NH_2)_2$=5:1, apply pressure of 10 Kg/cm² on the mixture to make a cylinder of 1 cm diameter and 0.6 cm height, then place in a high pressure vacuum chamber. The chamber is evacuated and filled with nitrogen up to the pressure shown in Table 1. One end of the cylinder is ignited by applying current to tungsten wire. The reaction is completed within 110–140 seconds and forms product of white powder. The product is shown to be aluminum nitride as confirmed by XRD analysis. Reaction conditions and results are listed in Table 1.

EXAMPLE 5
Addition of Dilutant

After mixing aluminum powder and urea powder with weight ratio $Al:CO(NH_2)_2=10:1$, add aluminum nitride powder as dilutant with amount 10% of the premixed mixture, apply pressure of 10 $Kg/cm^2$ on the mixture to make a cylinder of 1 cm diameter and 0.6 cm height, then place in a high pressure vacuum chamber. The chamber is evacuated and filled with nitrogen up to 6 atm. One end of the cylinder is ignited by applying current to tungsten wire. The reaction is completed in about 110 seconds and forms product of white powder. The product is shown to be aluminum nitride as confirmed by XRD analysis.

EXAMPLES 6–11
Different Aluminum Powder and Urea Mixing Weight Ratio and Pressing Force After mixing aluminum powder and urea $(CO(NH_2)_2)$ powder with various weight ratios, and adding various amounts of AlN, as listed in Table 2, apply various pressure on the mixture to make a cylinder of 1 cm diameter and 0.6 cm height, then place in a high pressure vacuum chamber. The chamber is evacuated and filled with nitrogen up to 3 atm. One end of the cylinder is ignited by applying current to tungsten wire. The reaction is completed within 110–140 seconds and forms product of white powder. The product is shown to be aluminum nitride as confirmed by XRD analysis. Reaction conditions and results are listed in Table 2.

EXAMPLES 12–14
Different Cylinder Size

After mixing aluminum powder and urea powder with weight ratio $Al:CO(NH_2)_2=4:1$, apply pressure of 30 $Kg/cm^2$ on the mixture to make a cylinder of different size, then place in a high pressure vacuum chamber. The chamber is evacuated and filled with nitrogen up to 3 atm. The compacts are ignited by applying currents to tungsten wires. The reaction is completed within 120–140 seconds and forms product of white powder. The product is shown to be aluminum nitride as confirmed by XRD analysis. Reaction conditions and results are listed in Table 3.

EXAMPLES 15–23
Different Compounds which Contains $NH_x$ or Halogens and can be Thermally Decomposed or Vaporized Below the Melting Point of Aluminum After mixing aluminum powder and compounds which contains $NH_x$ or halogens with appropriate ratio, and adding various amounts of AlN, apply pressure of 30 $Kg/cm^2$ on the mixture to make a cylinder of 1 cm diameter and 0.6 cm height, then place in a high pressure vacuum chamber. The chamber is evacuated and filled with nitrogen up to 4 atm. One end of the cylinder is ignited by applying current to tungsten wire. The reaction is completed within 40–150 seconds and forms product of white powder. The product is shown to be aluminum nitride (containing small amounts of $Al_{10}N_8O_3$ from $CO_3$ containing reactants) as confirmed by XRD analysis. Reaction condition and results are listed in Table 4.

EXAMPLES 24–29
Using Refractory Containers with an Opening End

After mixing aluminum powder, urea powder and AlN powder, fill the mixture in a graphite crucible, then place it in a high pressure vacuum chamber. The chamber is evacuated and filled with nitrogen up to 3 atm. The mixture is ignited by applying current to tungsten wire. The reaction is completed within 240 seconds and forms product of white powder. The product is shown to be aluminum nitride as confirmed by XRD analysis. Reaction conditions and results are listed in Table 5.

EXAMPLE 30

After mixing aluminum powder and urea powder with weight ratio $Al:CO(NH_2)_2=1:0.1$, fill the mixture in a graphite crucible having porous wall, then place it in a high pressure vacuum chamber. The chamber is evacuated and filled with nitrogen up to 1 atm. The mixture is ignited by applying current to tungsten wire. The reaction is completed within 180 seconds and forms product of white powder. The product is shown to be aluminum nitride as confirmed by XRD analysis.

Although the present invention has been described with several Examples, a myriad of changes, variations, alterations, transformations, and modifications may be suggested to one skilled in the art, and it is intended that the present invention encompass such changes, variations, alterations, transformations, and modifications as fall within the spirit and scope of the appended claims.

TABLE 1

| example | $N_2$ Pressure (atm) | reaction time (sec) |
| --- | --- | --- |
| 1 | 5 | ~110 |
| 2* | 3 | ~120 |
| 3 | 1 | ~135 |
| 4 | 0.9 | ~140 |

*using a graphite plate as heating element.

TABLE 2

| example | $Al:CO(NH_2)_2$ (weight ratio) | AlN (wt %) | compact forming pressure ($Kg/cm^2$) |
| --- | --- | --- | --- |
| 6 | 1:1.0 | 0 | 10 |
| 7* | 1:0.1 | 10 | 10 |
| 8 | 1:0.05 | 20 | 10 |
| 9 | 1:0.9 | 0 | 8 |
| 10 | 1:0.2 | 10 | 12 |
| 11 | 1:0.05 | 30 | 15 |

*using a graphite plate as heating element.

TABLE 3

| example | dimensions (diameter × height, cm) |
| --- | --- |
| 12 | 1 × 0.9 |
| 13* | 3 × 3 |
| 14* | 5 × 4 |

*heating is applied to three sides of the compact.

TABLE 4

| example | $NH_x$ or X containing compound | Al:$NH_x$ or X containing compound (weight ratio) | AlN (wt %) | reaction time (sec) |
|---|---|---|---|---|
| 15 | $(NH_4)_2CO_3$ | 1:1 | 0 | 80 |
| 16 | $NH_4HCO_3$ | 1:0.5 | 10 | 100 |
| 17 | $HCOONH_4$ | 1:0.2 | 20 | 150 |
| 18 | $NH_2CO_2NH_4$ | 1:1 | 0 | 90 |
| 19 | $N_2H_4.2HCl$ | 1:0.8 | 0 | 40 |
| 20 | $N_2H_4.HCl$ | 1:1.0 | 0 | 45 |
| 21 | $N_2H_4.HBr$ | 1:1.2 | 0 | 50 |
| 22 | $AlCl_3$ | 1:1.1 | 0 | 45 |
| 23 | $AlBr_3$ | 1:1.2 | 0 | 55 |

TABLE 5

| example | Al:$CO(NH_2)_2$ (weight ratio) | Al (wt %) (based on Al + $CO(NH_2)_2$) | reaction time (sec) |
|---|---|---|---|
| 24 | 1:0.8 | 0 | 180 |
| 25 | 1:0.5 | 0 | 200 |
| 26 | 1:0.05 | 0 | 235 |
| 27 | 1:0.1 | 10 | 210 |
| 28 | 1:0.05 | 10 | 230 |
| 29 | 1:0.02 | 20 | 240 |

What is claimed is:

1. A method for production of aluminum nitride comprises:
    (a) preparing reactant mixture from aluminum powder and a compound additive selected from the group consisting of urea ($CO(NH_2)_2)_2$), $NH_2CO_2NH_4$, ammonium carbonate (($NH_4)_2CO_3$), $NH_4HCO_3$, $HCOONH_4$, $N_2H_4HCl$, $N_2H_4HBr$, $N_2H_4.2HCl$, aluminum chloride ($AlCl_3$), and aluminum bromide ($AlBr_3$) wherein the compound additive is thermally decomposed or vaporized below the melting point of aluminum;
    (b) placing the reactant mixture in nitrogen environment; and
    (c) heating the mixture in nitrogen environment to produce aluminum nitride by combustion reaction.

2. The method of claim 1, in which the weight ratio between aluminum powder and the compound additive lies in 1:0.02–1.5.

3. The method of claim 2, in which the weight ratio between aluminum powder and the compound additive lies in 1:0.1–0.3.

4. The method of claim 1, in which dilutant of aluminum nitride powder can be added with appropriate ratio to the reactant mixture of aluminum powder and the compound additive in (a).

5. The method of claim 4, in which the weight of the aluminum nitride powder is 100 to 5% of the weight of aluminum powder and the compound additive.

6. The method of claim 4, in which the weight of the aluminum nitride powder is 10% of the weight of aluminum powder and the compound additive.

7. The method of claim 1, wherein the mixture in (b) is pressed into a compact and then placed in nitrogen environment.

8. The method of claim 1, wherein the mixture in (b) is filled in a refractory container having an opening end and then placed in nitrogen environment.

9. The method of claim 1, wherein the mixture in (b) is filled in a refractory container having porous walls and then placed in nitrogen environment.

10. The method of claim 7, wherein the compacts are formed under force of 8–50 Kg/cm$^2$.

11. The method of claim 7, wherein the compacts are made into cylinder.

12. The method of claim 8, wherein the refractory containers having an opening end are made from graphite, aluminum nitride, Boron nitride, aluminum oxide, or zirconium oxide.

13. The method of claim 9, wherein the refractory containers having porous walls are made from graphite, aluminum nitride, Boron nitride, aluminum oxide, or zirconium oxide.

14. The method of claim 1, wherein the step of heating in (c) proceeds by applying currents to tungsten wires, graphite plates, tungsten plates, or graphite resistors which are close to reactant compact.

15. The method of claim 1, wherein the step of heating in (c) proceeds by laser irradiation.

16. The method of claim 1, wherein the nitrogen environment in (b) is achieved by evacuating a chamber and filling the chamber with nitrogen, after the mixture is placed in the chamber.

17. The method of claim 16, wherein the chamber is a high pressure reactor.

18. The method of claim 16, wherein the nitrogen pressure in the chamber is in the range of 0.9–10 atm.

19. The method of claim 4, wherein the mixture is pressed into a compact and then placed in nitrogen environment.

20. The method of claim 4, wherein the mixture is filled in a refractory container having an opening end and then placed in nitrogen environment.

21. The method of claim 4, wherein the mixture is filled in a refractory container having porous walls and then placed in nitrogen environment.

* * * * *